(12) United States Patent
Mizutani et al.

(10) Patent No.: US 10,843,740 B2
(45) Date of Patent: Nov. 24, 2020

(54) VEHICLE FLOOR STRUCTURE

(71) Applicant: TOYOTA JIDOSHA KABUSHIKI KAISHA, Toyota (JP)

(72) Inventors: Atsushi Mizutani, Toyota (JP); Yuma Saiki, Toyota (JP); Momoko Azuma, Itabashi-ku (JP); Yusaku Morita, Miyoshi (JP); Kanako Naruse, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 16/234,659

(22) Filed: Dec. 28, 2018

(65) Prior Publication Data

US 2019/0210658 A1    Jul. 11, 2019

(30) Foreign Application Priority Data

Jan. 10, 2018  (JP) ................................ 2018-002242

(51) Int. Cl.
    *B62D 25/20*     (2006.01)
    *B60L 58/33*     (2019.01)
    (Continued)

(52) U.S. Cl.
    CPC ..... *B62D 25/2009* (2013.01); *B60H 1/00278* (2013.01); *B60H 1/00392* (2013.01); *B60H 1/143* (2013.01); *B60K 1/04* (2013.01); *B60L 58/24* (2019.02); *B60L 58/33* (2019.02); *B60S 1/64* (2013.01); *B62D 25/20* (2013.01); *B60H 2001/003* (2013.01);
    (Continued)

(58) Field of Classification Search
    CPC ............ B60S 1/64; B60H 2001/00221; B60K 2001/0438; B60N 3/08
    USPC ...... 296/37.8, 37.1, 37.14, 37.9, 37.16, 208, 296/37.11
    See application file for complete search history.

(56) References Cited

U.S. PATENT DOCUMENTS 2,499,942 A * 3/1950 Boyce .................... B60N 3/086
                                                      224/278
4,917,430 A * 4/1990 Lawrence ................. B60R 7/04
                                                      224/281

(Continued)

FOREIGN PATENT DOCUMENTS

JP        2016-194854       11/2016

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A vehicle floor structure is provided including: a vehicle interior opening formation section provided inside a vehicle cabin, and demarcating a vehicle interior opening that opens into the vehicle cabin; a vehicle exterior opening formation section provided further toward a vehicle lower side than a floor inside the vehicle cabin, and demarcating a vehicle exterior opening that opens toward a vehicle exterior; a storage section provided at the vehicle lower side of the floor, and demarcating a storage space that connects the vehicle interior opening and the vehicle exterior opening together; and a pull-out receptacle disposed inside the storage section at a position corresponding to the vehicle interior opening, and capable of moving from inside the storage section to the vehicle exterior through the vehicle exterior opening.

10 Claims, 11 Drawing Sheets

(51) Int. Cl.
*B60L 58/24* (2019.01)
*B60K 1/04* (2019.01)
*B60H 1/00* (2006.01)
*B60S 1/64* (2006.01)
*B60H 1/14* (2006.01)
*B60K 1/00* (2006.01)

(52) U.S. Cl.
CPC ............... *B60H 2001/00221* (2013.01); *B60K 2001/005* (2013.01); *B60K 2001/0438* (2013.01); *B60Y 2200/91* (2013.01); *B60Y 2306/05* (2013.01)

(56) References Cited

U.S. PATENT DOCUMENTS

| | | | |
|---|---|---|---|
| 6,079,770 A * | 6/2000 | Bocian | B60R 15/04 |
| | | | 296/190.01 |
| 2003/0137164 A1* | 7/2003 | Schickel | B60N 2/90 |
| | | | 296/208 |
| 2018/0029710 A1* | 2/2018 | Schliwa | B64D 11/0007 |

* cited by examiner

VEHICLE FLOOR STRUCTURE

CROSS-REFERENCE TO RELATED APPLICATION

This application claims priority under 35 USC 119 from Japanese Patent Application No. 2018-002242 filed on Jan. 10, 2018, the disclosure of which is incorporated by reference herein in its entirety.

BACKGROUND

Technical Field

The present disclosure relates to a vehicle floor structure.

Related Art

Japanese Patent Application Laid-Open (JP-A) No. 2016-194854 discloses an invention relating to a ride-sharing support system. In this ride-sharing support system, a driver driving a domestic-use vehicle registers a journey. If a reservation is made by a passenger who wishes to accompany the driver on the registered journey, a match is achieved and the driver and the passenger are both informed. This enables ride-sharing of vehicles to be achieved simply.

Ride-sharing services such as disclosed in JP-A No. 2016-194854 improve user convenience and thereby may be expected to increase vehicle utilization. However, in such cases, it is conceivable that trash and the like will build up in the vehicle cabin as a result of use by several users, resulting in the vehicle cabin becoming dirty. Cleaning the vehicle cabin interior is laborious, and the ride-sharing service cannot be provided while the vehicle is being cleaned. There is thus a possibility that regular cleaning of the vehicle cabin interior might drag down the improvement in vehicle utilization. There is accordingly room for improvement in this related technology.

SUMMARY

The present disclosure provides a vehicle floor structure that enables a vehicle cabin interior to be cleaned easily.

A first aspect of the present disclosure is a vehicle floor structure including: a vehicle interior opening formation section provided inside a vehicle cabin and demarcating a vehicle interior opening that opens into the vehicle cabin; a vehicle exterior opening formation section provided further toward a vehicle lower side than a floor inside the vehicle cabin and demarcating a vehicle exterior opening that opens toward a vehicle exterior; a storage section provided at the vehicle lower side of the floor and demarcating a storage space that connects the vehicle interior opening and the vehicle exterior opening together; and a pull-out receptacle disposed inside the storage section at a position corresponding to the vehicle interior opening and capable of moving from inside the storage section to the vehicle exterior through the vehicle exterior opening.

The first aspect includes the vehicle interior opening formation section, the vehicle exterior opening formation section, the storage section, and the pull-out receptacle. The vehicle interior opening formation section is provided inside the vehicle cabin and demarcates the vehicle interior opening that opens into the vehicle cabin. The vehicle exterior opening formation section is provided further toward the vehicle lower side than the floor inside the vehicle cabin and demarcates the vehicle exterior opening that opens toward the vehicle exterior. The storage section is provided at the vehicle lower side of the floor and demarcates the storage space that connects the vehicle interior opening and the vehicle exterior opening together. The pull-out receptacle is disposed inside the storage section at a position corresponding to the vehicle interior opening. Thus, when trash is inserted into the vehicle interior opening formation section, the trash passes through the vehicle interior opening and drops into the pull-out receptacle inside the storage section at the vehicle lower side. Note that the pull-out receptacle is capable of moving from inside the storage section to the vehicle exterior through the vehicle exterior opening. This enables the pull-out receptacle when containing trash to be pulled out toward the vehicle exterior through the inside of the vehicle exterior opening formation section, and trash inside the pull-out receptacle to be disposed of easily.

A second aspect of the present disclosure is the vehicle floor structure of the first aspect, wherein the vehicle interior opening formation section is provided in a back face of a vehicle seat disposed inside the vehicle cabin.

In the second aspect, the vehicle interior opening formation section is provided in the back face of the vehicle seat disposed inside the vehicle cabin. This enables an occupant onboard the vehicle, in particular an occupant seated in a vehicle seat provided at the vehicle rear side of this vehicle seat, to easily insert trash into the vehicle interior opening formation section. This enables trash to be suppressed from being left in the vehicle cabin.

A third aspect is the vehicle floor structure of the first aspect or the second aspect, wherein the vehicle interior opening formation section is provided in the floor.

In the third aspect, the vehicle interior opening formation section is provided in the floor, such that trash left on the floor can be inserted into the vehicle interior opening formation section without being picked up. This thereby enables trash to be suppressed from being left in the vehicle cabin.

A fourth aspect is the vehicle floor structure of any one of the first to the third aspects, wherein the floor includes a mesh pattern section formed in a mesh pattern by disposing a plurality of vehicle interior opening formation sections contiguously to each other.

In the fourth aspect, the floor includes a mesh pattern section. The mesh pattern section is formed in a mesh pattern by disposing plural of the vehicle interior opening formation sections contiguously to each other. Accordingly, trash dropped onto the floor can effortlessly and easily be inserted into the storage section through the vehicle interior opening formation sections of the mesh pattern section. Namely, trash can easily be inserted into the storage section.

A fifth aspect is the vehicle floor structure of any one of the first to the fourth aspects, wherein the pull-out receptacle is provided with a receptacle slope that faces the floor, and that is inclined toward the vehicle lower side on progression toward the vehicle exterior opening formation section when the pull-out receptacle is disposed inside the storage section.

In the fifth aspect, the pull-out receptacle is provided with the receptacle slope. The receptacle slope faces the floor and is inclined toward the vehicle lower side on progression toward the vehicle exterior opening formation section. Trash that has dropped into the pull-out receptacle therefore traverses the receptacle slope and collects on the side of the vehicle exterior opening formation section. This facilitates the task of pulling the pull-out receptacle out from the vehicle exterior opening formation section and discarding the trash.

A sixth aspect is the vehicle floor structure of any one of the first to the fifth aspects, wherein the storage section is provided with a storage slope that faces the floor, and that is inclined toward the vehicle lower side toward the pull-out receptacle.

In the sixth aspect, the storage section is provided with the storage slope. The storage slope faces the floor and is inclined toward the vehicle lower side toward the pull-out receptacle. Accordingly, even when trash that has been inserted through the vehicle interior opening formation section drops onto a location inside the storage section where the pull-out receptacle is not disposed, the trash traverses the storage slope and collects inside the pull-out receptacle. There is accordingly no need to provide the pull-out receptacle over a wide range. Namely, for example, the size of the pull-out receptacle and the size of the vehicle exterior opening formation section through which the pull-out receptacle is pulled out can be made smaller.

A seventh aspect is the vehicle floor structure of any one of the first to the sixth aspects, wherein a blower is provided inside the storage section to convey an airflow from a vehicle air conditioner toward the pull-out receptacle.

In the seventh aspect, the blower is provided inside the storage section to convey an airflow from the vehicle air conditioner toward the pull-out receptacle, enabling trash remaining in the storage section to be moved toward the pull-out receptacle by the airflow. This thereby enables trash to be suppressed from remaining inside the vehicle cabin.

An eighth aspect is the vehicle floor structure of any one of the first to the seventh aspects, wherein a drive battery is provided at the vehicle lower side of the floor, and the pull-out receptacle is configured from metal and is installed at a vehicle upper side of the drive battery.

In the eighth aspect, the metal pull-out receptacle is installed at the vehicle upper side of the drive battery provided at the vehicle lower side of the floor. Accordingly, warm air or cold air inside the vehicle cabin is transmitted through the vehicle interior opening formation section to the pull-out receptacle inside the storage section, such that the pull-out receptacle attains a temperature close to the temperature inside the vehicle cabin. This heat in the pull-out receptacle is transmitted to the drive battery, enabling a contribution to be made to cooling or warming the drive battery.

A ninth aspect is the vehicle floor structure of any one of the first to the seventh aspects, wherein a drive battery is provided at the vehicle lower side of the floor, and the pull-out receptacle is provided at the vehicle lower side of the drive battery.

In the ninth aspect, the pull-out receptacle is provided at the vehicle lower side of the drive battery provided at the vehicle lower side of the floor, thereby enabling direct input to the drive battery from obstacles and the like outside the vehicle to be suppressed by the pull-out receptacle.

As explained above, the vehicle floor structure according to the first aspect enables cleaning of the vehicle cabin interior to be performed easily.

The vehicle floor structures according to the second to the fourth aspects enable cleanliness to be easily maintained in the vehicle cabin.

The vehicle floor structures according to the fifth and seventh aspects enable trash to be more easily processed.

The vehicle floor structure according to the sixth aspect enables manufacturing costs to be suppressed.

The vehicle floor structure according to the eighth aspect enables a contribution to be made to maintaining the performance of the drive battery.

The vehicle floor structure according to the ninth aspect enables the drive battery to be protected.

BRIEF DESCRIPTION OF THE DRAWINGS

Exemplary embodiments of the present disclosure will be described in detail based on the following figures, wherein:

FIG. 11 is a schematic perspective view illustrating a state in which FIG. 10 is viewed from the vehicle rear.

DETAILED DESCRIPTION

First Exemplary Embodiment

Figure 1:
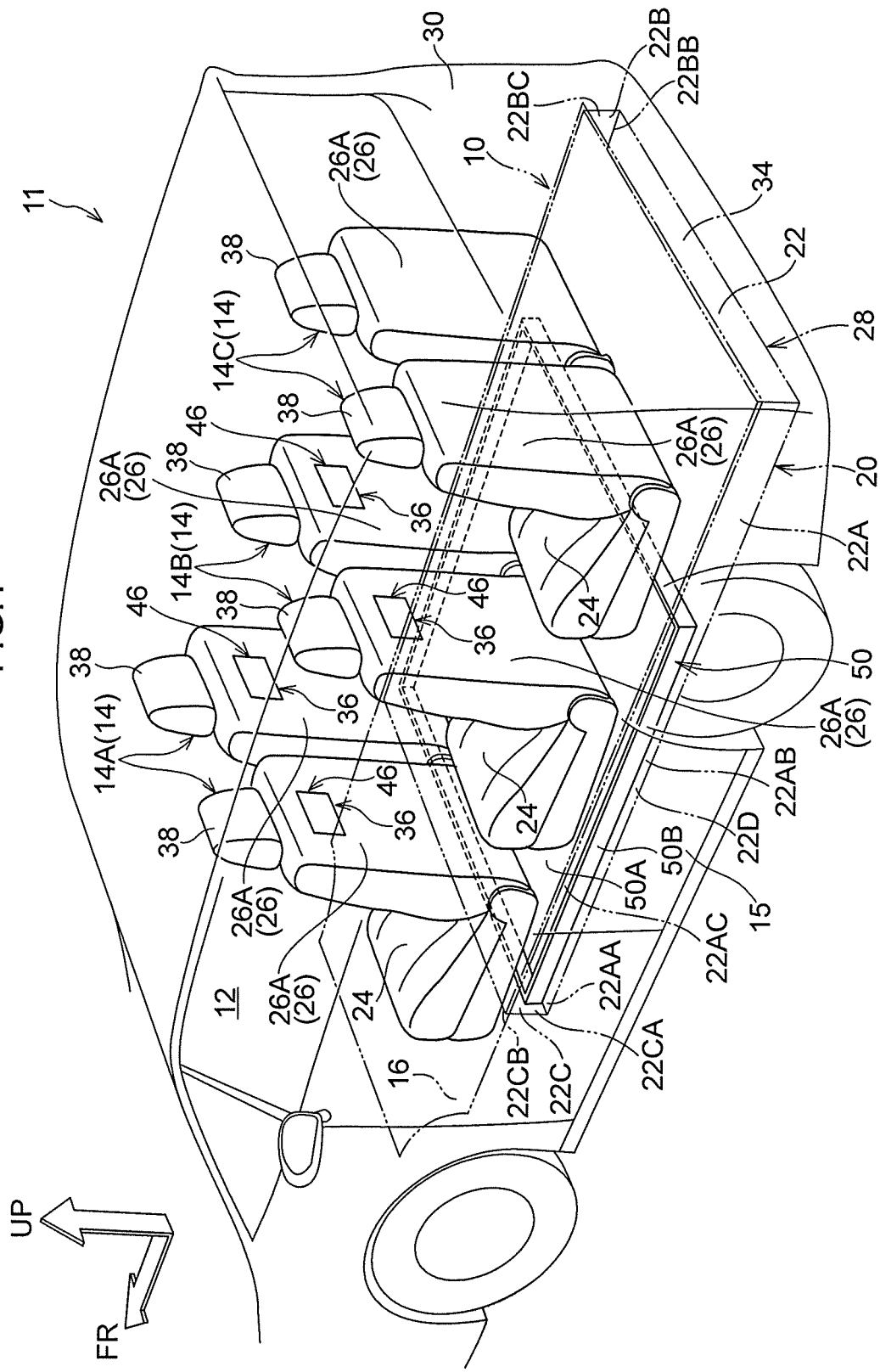
FIG. 1 is a schematic perspective view illustrating a vehicle including a vehicle floor structure according to a first exemplary embodiment.
Figure 2:
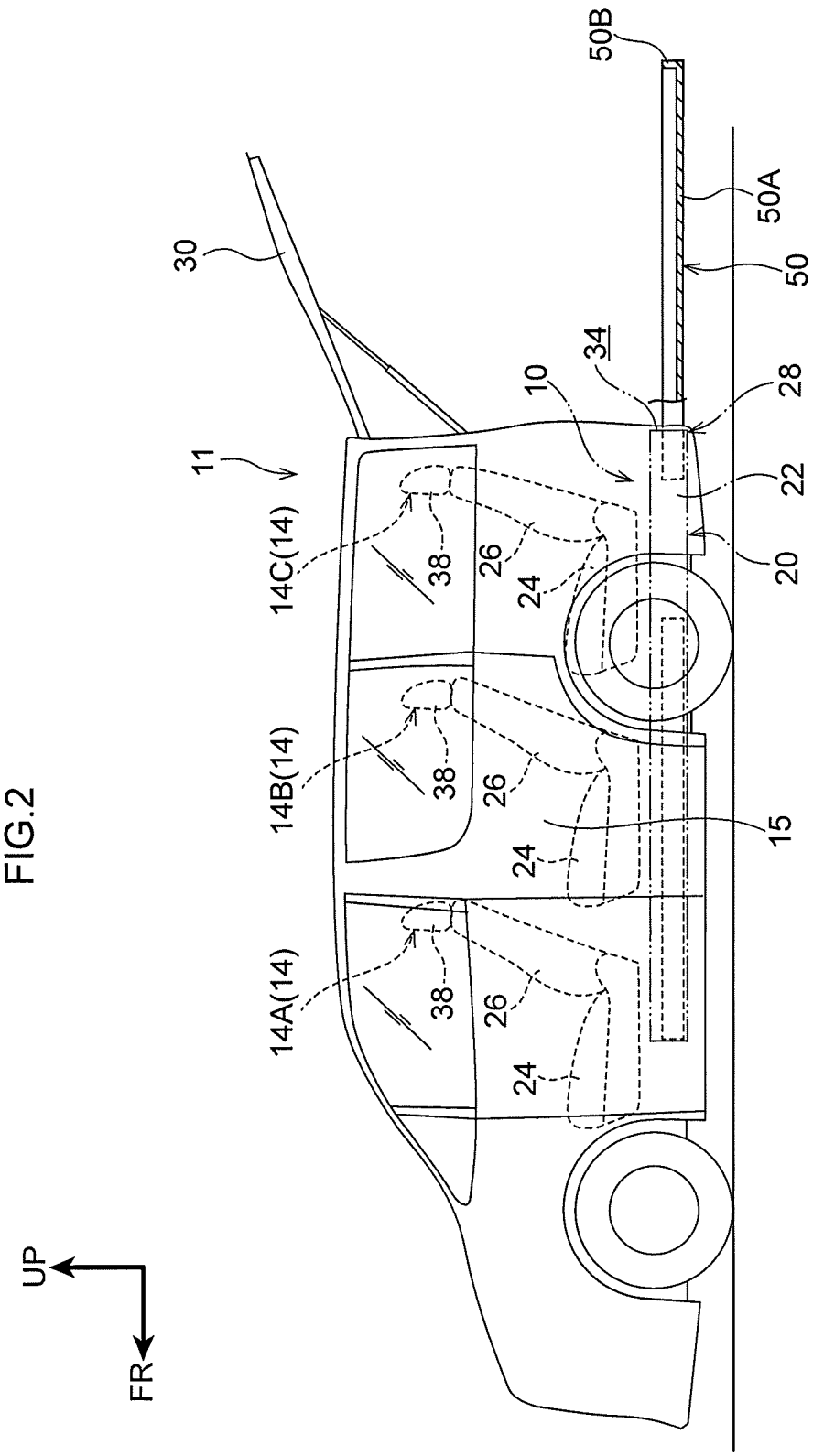
FIG. 2 is a side view illustrating a state in which a pull-out receptacle has been pulled out toward a vehicle exterior in a vehicle floor structure according to the first exemplary embodiment.
Figure 3:
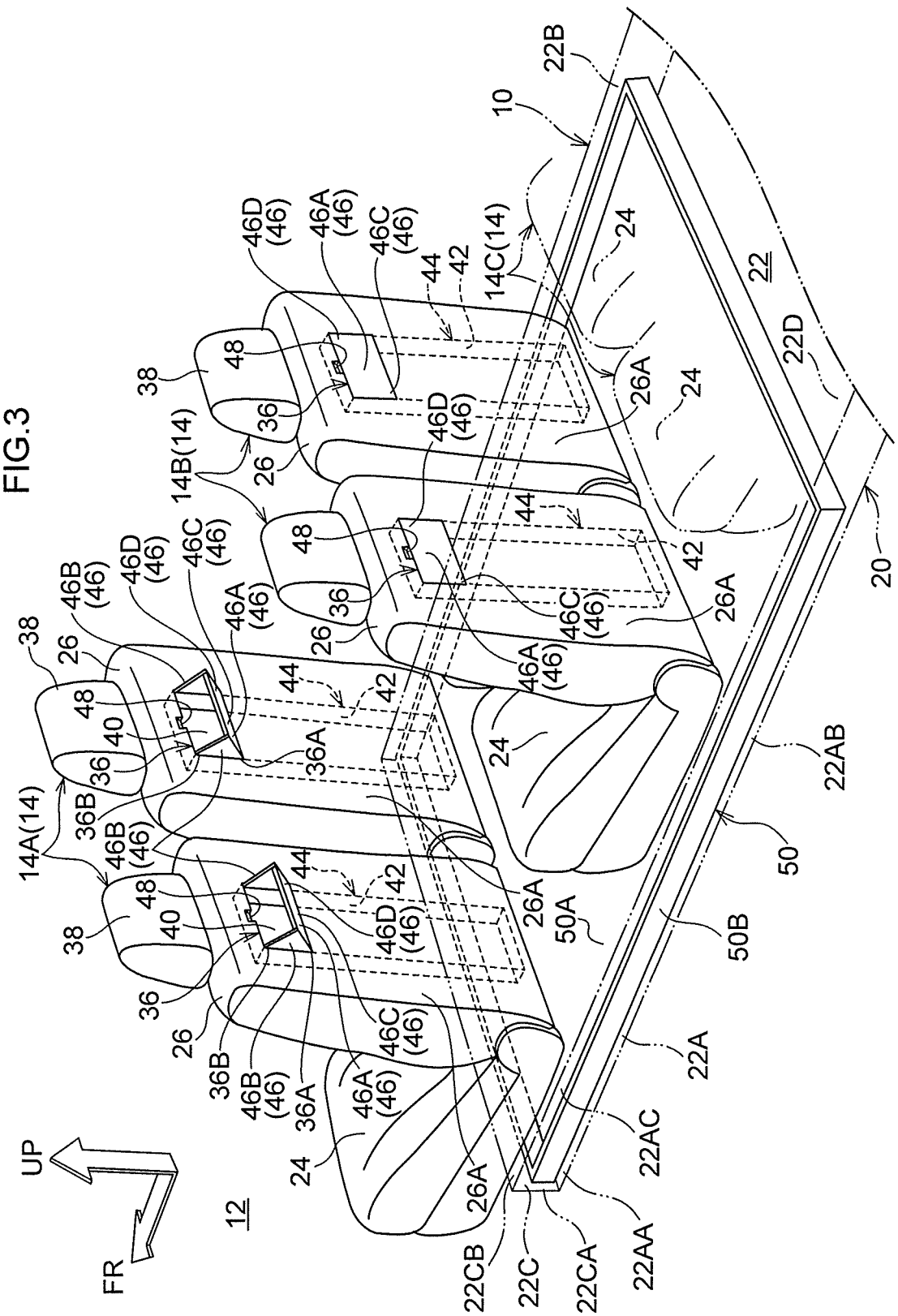
FIG. 3 is a schematic perspective view illustrating a vehicle cabin interior of a vehicle including a vehicle floor structure according to the first exemplary embodiment.

Explanation follows regarding a first exemplary embodiment of a vehicle floor structure according to the present disclosure, with reference to FIG. 1 to FIG. 3. Note that in each of the drawings, the arrow indicates the vehicle front in a vehicle front-rear direction, the arrow OUT indicates a vehicle width direction outer side, and the arrow UP indicates a vehicle upper side in a vehicle vertical direction.

Vehicle

As illustrated in FIG. 1, a vehicle 11 applied with a vehicle floor structure 10 according to the present exemplary embodiment is a minivan-type passenger car including, for example, vehicle seats 14, described later, inside a vehicle cabin 12. The vehicle seats 14 are arranged in three rows, and side doors 15 are provided on both side sections of the vehicle 11 (although only illustrated on one side in the drawings) for accessing the vehicle seats 14 in the second and third rows.

The vehicle seats 14 are installed on a floor 16, described later. Each vehicle seat 14 is configured by a seat cushion 24 to support the waist and thighs (neither of which are illustrated in the drawings) of an occupant, a seatback 26 to support the back (not illustrated in the drawings) of the occupant, and a headrest 38 to support the head (not illustrated in the drawings) of the occupant.

Storage Section

The floor 16 is formed in a substantially rectangular plate shape, with its length direction along the vehicle front-rear direction in vehicle plan view, and configures a floor section of the vehicle cabin 12. A floor carpet, not illustrated in the drawings, is laid on the floor 16 inside the vehicle cabin.

A storage section 20 is provided at the vehicle lower side of the floor 16. The storage section 20 demarcates a storage space 22, this being a box-shaped space with a substantially rectangular shape in vehicle plan view opening toward the vehicle rear. Namely, for example, the storage section 20 includes a pair of left and right side walls 22A, 22B, a front wall 22C connecting together front ends 22AA, 22BA of the side walls 22A, 22B, and a bottom wall 22D connecting together lower ends 22AB, 22BB of the side walls 22A, 22B and a lower end 22CA of the front wall 22C. Upper ends 22AC, 22BC of the side walls 22A, 22B and an upper end 22CB of the front wall 22C are joined to a vehicle lower side face of the floor 16, thereby demarcating the storage space 22.

The front wall 22C of the storage section 20 is provided at the vehicle lower side of a first row of vehicle seats 14A (including a driver's seat and a front passenger seat). Specifically, the front wall 22C is positioned further toward the vehicle front than the seatbacks 26 of the vehicle seats 14 when the first row of vehicle seats 14A have been moved to a frontmost end by a slide mechanism, not illustrated in the drawings.

The side walls 22A, 22B of the storage section 20 are disposed at positions corresponding to vehicle width direction outer side ends of the respective vehicle seats 14.

Vehicle Exterior Opening Formation Section

A vehicle exterior opening formation section 28 is provided at the vehicle rear side and at a vehicle lower side of the floor 16. As illustrated in FIG. 2, the vehicle exterior opening formation section 28 is provided to a rear panel forming a tailgate opening (not illustrated in the drawings) when a tailgate door 30 is in an open state, and demarcates a substantially rectangular vehicle exterior opening 34 open toward the vehicle rear in vehicle face-on view, as illustrated in FIG. 1. In the present exemplary embodiment, the vehicle exterior opening formation section 28 is configured by the floor 16, and the side walls 22A, 22B and bottom wall 22D of the storage section 20. Namely, the storage section 20 and the vehicle exterior opening formation section 28 are both configured by the same members. Note that the side walls 22A, 22B extend along the vehicle front-rear direction, and so a vehicle width direction dimension of the storage section 20 is set substantially the same as a vehicle width direction dimension of the vehicle exterior opening formation section 28.

Vehicle Interior Opening Formation Section

As illustrated in FIG. 3, vehicle interior opening formation sections 36 are provided in back faces 26A of the seatbacks 26 of the first row of vehicle seats 14A and a second row of vehicle seats 14B. Each vehicle interior opening formation section 36 is formed to the back face 26A of the corresponding seatback 26 in the vicinity of the headrest 38, and demarcates a substantially rectangular shaped vehicle interior opening 40 opening toward the vehicle cabin interior in vehicle face-on view. A communication space formation section 44 demarcating a communication space 42, this being a space connecting the vehicle interior opening 40 to the storage space 22, is provided inside the seatback 26 of each vehicle seat 14. The communication space formation section 44 is cut out from a cushion pad, not illustrated in the drawings, inside the seatback 26 to form the communication space 42.

A cover member 46 is attached to each vehicle interior opening formation section 36 on the vehicle cabin side. Each cover member 46 includes a front face plate member 46A formed with its plate thickness direction substantially in the vehicle front-rear direction, and in a substantially rectangular shape substantially the same as that of the vehicle interior opening 40 in vehicle face-on view, and a pair of side plate members 46B with a plate thickness direction running in the vehicle width direction and attached to side faces of the front face plate member 46A. A lower end 46C of each cover member 46 is attached to a lower end 36A of the vehicle interior opening formation section 36 through a swing shaft, not illustrated in the drawings, so as to be capable of swinging about an axial direction running in the vehicle width direction. Accordingly, when an upper end 46D of the cover member 46 is swung toward the vehicle rear, a space demarcated by the front face plate member 46A and the side plate members 46B is placed in communication with the vehicle interior opening 40. Note that the upper end 46D of each cover member 46 and an upper end 36B of the corresponding vehicle interior opening formation section 36 are provided with a lock 48 such that the cover member 46 can be retained in a closed state of the cover member 46 (in which the cover member 46 closes off the vehicle interior opening 40).

Pull-Out Receptacle

A pull-out receptacle 50 is provided inside the storage section 20. The pull-out receptacle 50 is installed on a vehicle lower side face inside the storage section 20, namely, on the bottom wall 22D. The pull-out receptacle 50 is formed in a substantially box shape opening toward the vehicle upper side by a receptacle bottom wall 50A with its plate thickness direction along the vehicle vertical direction, and outer frame walls 50B projecting up toward the vehicle upper side from outer edges of the receptacle bottom wall 50A.

The outer frame walls 50B of the pull-out receptacle 50 include a pair of outer frame walls 50B extending substantially along the vehicle front-rear direction and set such that their outer faces abut the side walls 22A, 22B of the storage section 20. Accordingly, as illustrated in FIG. 2, the pull-out receptacle 50 is capable of moving between the inside of the storage section 20 and the vehicle exterior through the vehicle exterior opening 34. As illustrated in FIG. 3, the size of the pull-out receptacle 50 is set such that in a state in which the outer frame wall 50B at the vehicle front of the pull-out receptacle 50 abuts the front wall 22C of the storage section 20, the outer frame wall 50B at the vehicle rear of the pull-out receptacle 50 is positioned at the vehicle lower side of a third row of vehicle seats 14C.

Operation of First Exemplary Embodiment

Next, explanation follows regarding operation of the first exemplary embodiment.

As described above, as illustrated in FIG. 1, the present exemplary embodiment includes the vehicle interior opening formation sections 36, the vehicle exterior opening formation section 28, the storage section 20, and the pull-out receptacle 50. The vehicle interior opening formation sections 36 are provided inside the vehicle cabin 12, and demarcate the corresponding vehicle interior openings 40 that open toward the interior of the vehicle cabin 12. The vehicle exterior opening formation section 28 is provided further toward the vehicle lower side than the floor 16 in the vehicle cabin 12, and demarcates the vehicle exterior opening 34 that opens toward the vehicle exterior. The storage section 20 is provided at the vehicle lower side of the floor 16, and demarcates the storage space 22 that connects the vehicle interior openings 40 and the vehicle exterior opening 34 together. The pull-out receptacle 50 is disposed in a position inside the storage section 20 that corresponds to the vehicle interior openings 40. Accordingly, when trash is inserted into one of the vehicle interior opening formation sections 36, the trash drops through the vehicle interior opening 40 onto the pull-out receptacle 50 inside the storage space 22 at the vehicle lower side. Note that the pull-out receptacle 50 is capable of moving from the inside of the storage section 20 to the vehicle exterior through the vehicle exterior opening 34. Accordingly, when the pull-out receptacle 50 contains trash, the pull-out receptacle 50 can be pulled out toward the vehicle exterior through the vehicle exterior opening formation section 28, enabling the trash in the pull-out receptacle 50 to be disposed of easily. This thereby enables cleaning of the vehicle cabin 12 interior to be performed easily.

Moreover, the vehicle interior opening formation sections 36 are provided in the back faces 26A of the vehicle seats 14 disposed in the vehicle cabin 12. Accordingly, occupants of the vehicle 11, in particular occupants seated on vehicle seats 14 provided behind other vehicle seats 14, are able to easily insert trash into the vehicle interior opening formation sections 36. Trash can thus be suppressed from being left in the vehicle cabin 12. Cleanliness can thus be easily maintained in the vehicle cabin.

Figure 4:
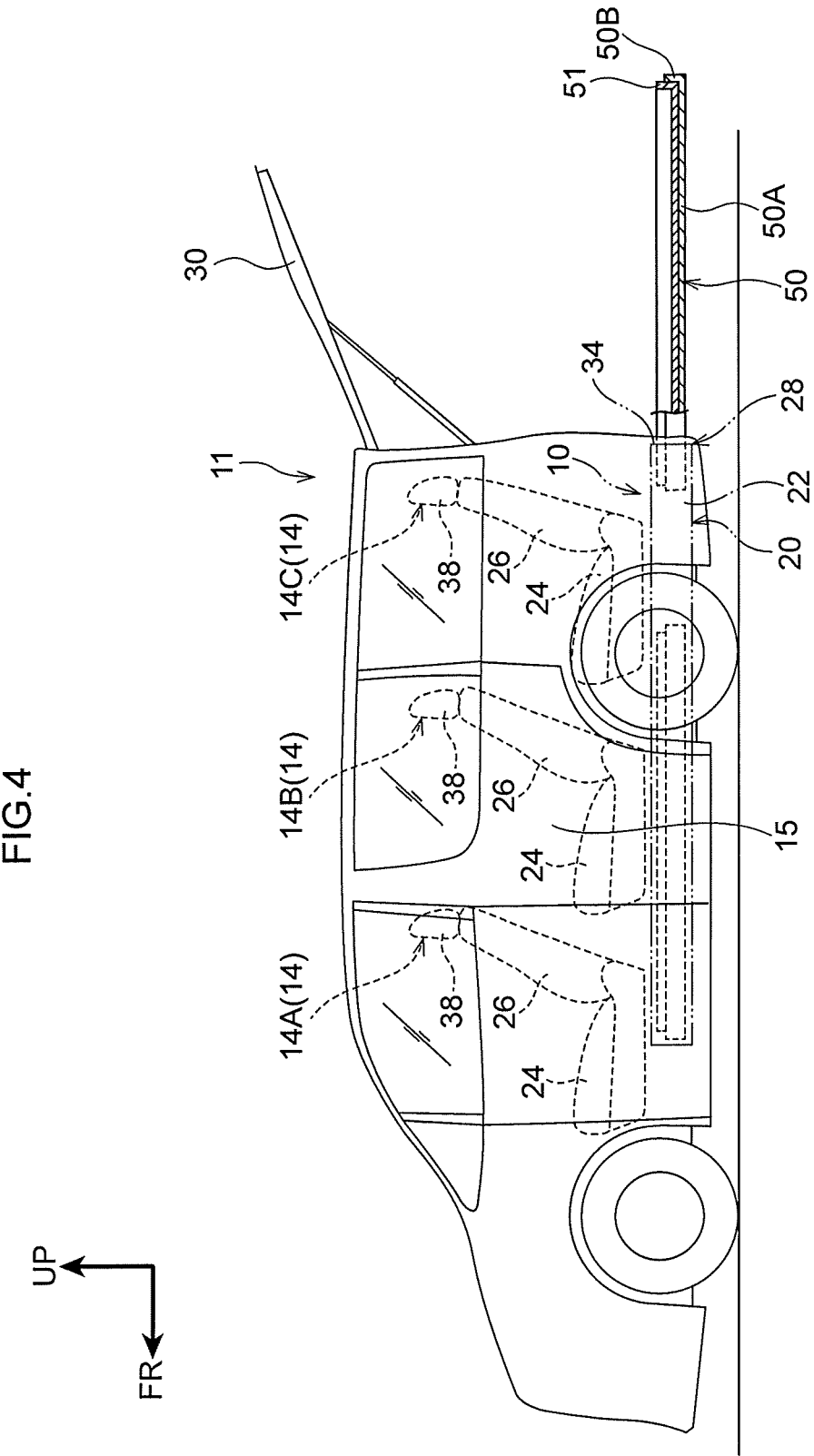
FIG. 4 is a side view illustrating a state in which a pull-out receptacle has been pulled out toward a vehicle exterior in a vehicle floor structure according to a modified example of the first exemplary embodiment.

Note that in the present exemplary embodiment, configuration is made in which trash enters the pull-out receptacle 50; however, there is no limitation thereto. As illustrated in FIG. 4, configuration may be made such that a trash-catching tray 51 is provided inside the pull-out receptacle 50, enabling cleaning to be made even easier.

Second Exemplary Embodiment

Figure 5:
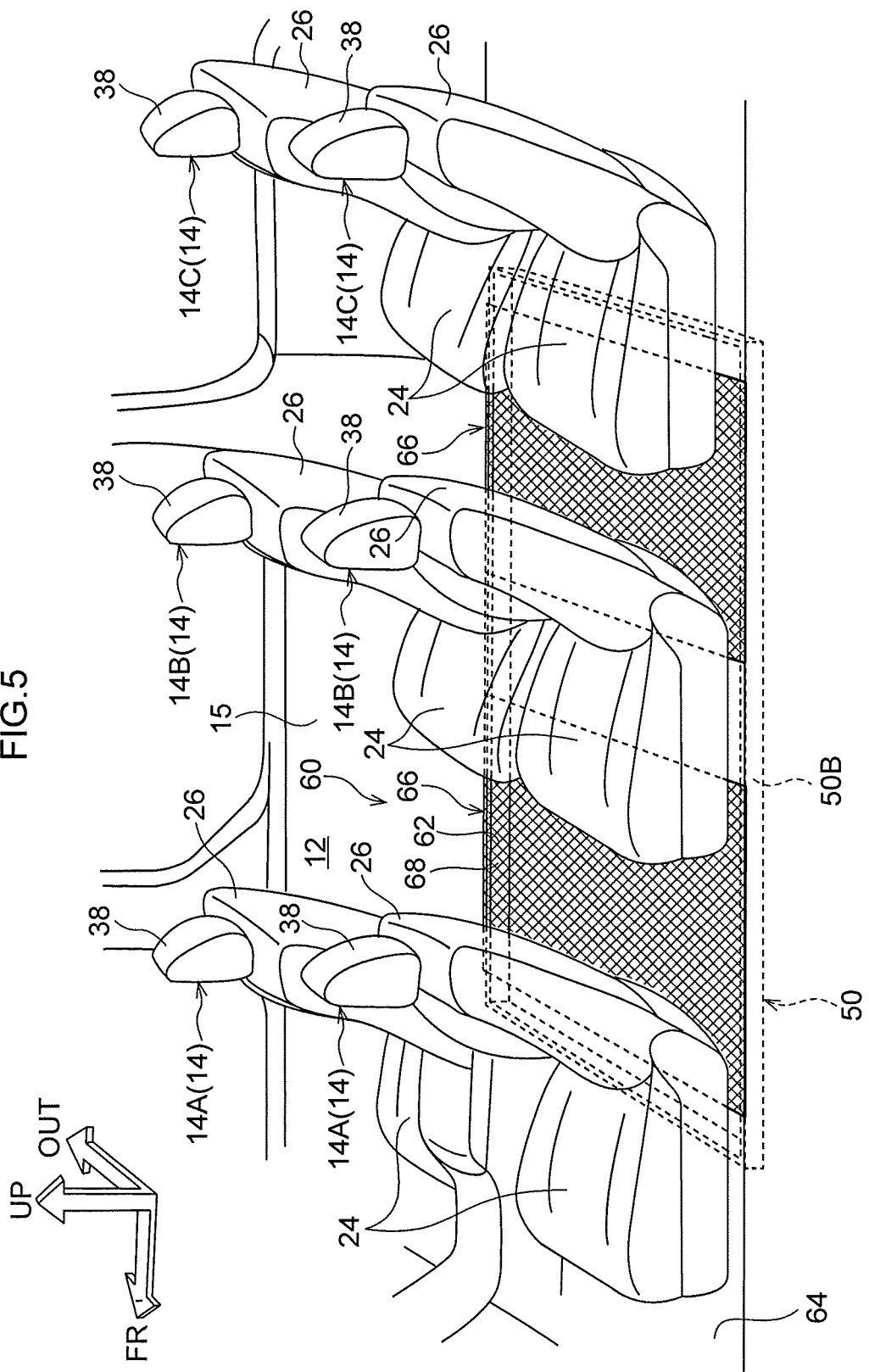
FIG. 5 is a schematic perspective view illustrating a vehicle cabin interior of a vehicle including a vehicle floor structure according to a second exemplary embodiment.

Next, explanation follows regarding a vehicle floor structure according to a second exemplary embodiment of the present disclosure, with reference to FIG. 5. Note that configuration sections equivalent to those of the first exemplary embodiment and so on described above are allocated the same reference numerals, and explanation thereof is omitted.

A vehicle floor structure 60 according to the second exemplary embodiment has the same basic configuration as that of the first exemplary embodiment, but features vehicle interior opening formation sections 62 provided to a floor 64.

Namely, as illustrated in FIG. 5, a mesh pattern section 66 is provided to the floor 64 between the first row of vehicle seats 14A and the second row of vehicle seats 14B, and between the second row of vehicle seats 14B and the third row of vehicle seats 14C. In other words, the mesh pattern sections 66 are provided at the feet of occupants seated in the vehicle seats 14 in the second row and the third row. Each mesh pattern section 66 is configured by a mesh pattern of plural contiguous vehicle interior opening formation sections 62. Namely, the vehicle interior opening formation sections 62 are provided in the floor 64. Note that vehicle interior openings 68 demarcated by the vehicle interior opening formation sections 62 are open toward the vehicle upper side and the inside of the vehicle cabin 12, and the size of each vehicle interior opening 68 is, for example, set smaller than the size of a child's foot.

The storage section 20 and the pull-out receptacle 50 are provided at the vehicle lower side of the floor 64. Accordingly, trash that has been dropped onto the mesh pattern sections 66 falls through the vehicle interior openings 68 into the pull-out receptacle 50.

Operation of Second Exemplary Embodiment

Next, explanation follows regarding operation of the second exemplary embodiment.

The configuration described above is configured similarly to the vehicle floor structure 10 of the first exemplary embodiment, with the exception of the point that the vehicle interior opening formation sections 62 are provided to the floor 64. Accordingly, similar advantageous effects to those of the first exemplary embodiment are obtained. Moreover, due to providing the vehicle interior opening formation sections 62 to the floor 64, trash left on the floor 64 can be inserted through the vehicle interior opening formation sections 62 without being picked up. This thereby enables trash to be suppressed from being left in the vehicle cabin 12.

Moreover, the floor 64 includes the mesh pattern sections 66. The mesh pattern sections 66 are formed in a mesh pattern in which plural of the vehicle interior opening formation sections 62 are disposed contiguously to each other. Accordingly, trash dropped onto the floor 64 is effortlessly and easily inserted into the storage section 20 through the vehicle interior opening formation sections 62 of the mesh pattern sections 66. Namely, trash can be easily inserted into the storage section 20. This enables cleanliness to be easily maintained in the vehicle cabin 12.

Since the floor 64 is configured by the mesh pattern sections 66 at the feet of occupants seated in the vehicle seats 14B, 14C, dirt and the like stuck to an occupant's shoes is able to fall into the pull-out receptacle 50 in the storage section 20, thereby enabling cleanliness to be maintained in the vehicle cabin 12 without effort.

Figure 6:
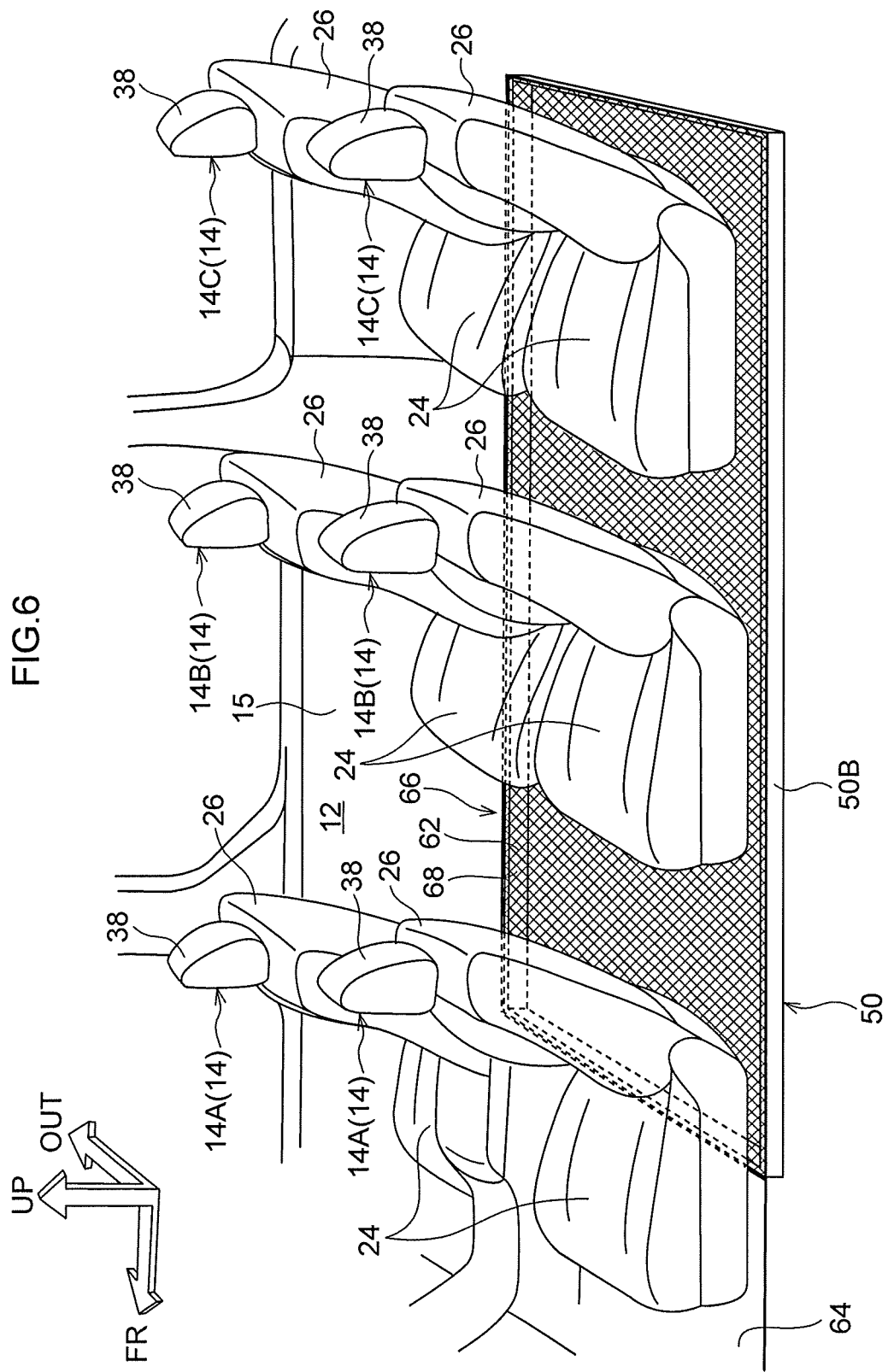
FIG. 6 is a schematic perspective view illustrating a vehicle cabin interior of a vehicle including a vehicle floor structure according to a modified example of the second exemplary embodiment.

Note that in the present exemplary embodiment, the mesh pattern sections 66 are provided to the floor 64 between the first row of vehicle seats 14A and the second row of vehicle seats 14B, and between the second row of vehicle seats 14B and the third row of vehicle seats 14C; however, there is no limitation thereto. As illustrated in FIG. 6, a mesh pattern section 66 may be provided over a wider area including the lower side of the vehicle seats 14C. Moreover, although not illustrated in the drawings, configuration may be made in which a mesh pattern section 66 is provided so as to include a position corresponding to the feet of occupants seated in the first row of vehicle seats 14A.

Moreover, configuration is made in which the floor 64 is provided with the mesh pattern sections 66 in which plural of the vehicle interior opening formation sections 62 are disposed contiguously to each other; however, there is no limitation thereto. Configuration may be made in which a single vehicle interior opening formation section 62 is provided to the floor 64, or configuration may be made in which plural vehicle interior opening formation sections 62 are provided at intervals in the floor 64.

Third Exemplary Embodiment

Figure 7:
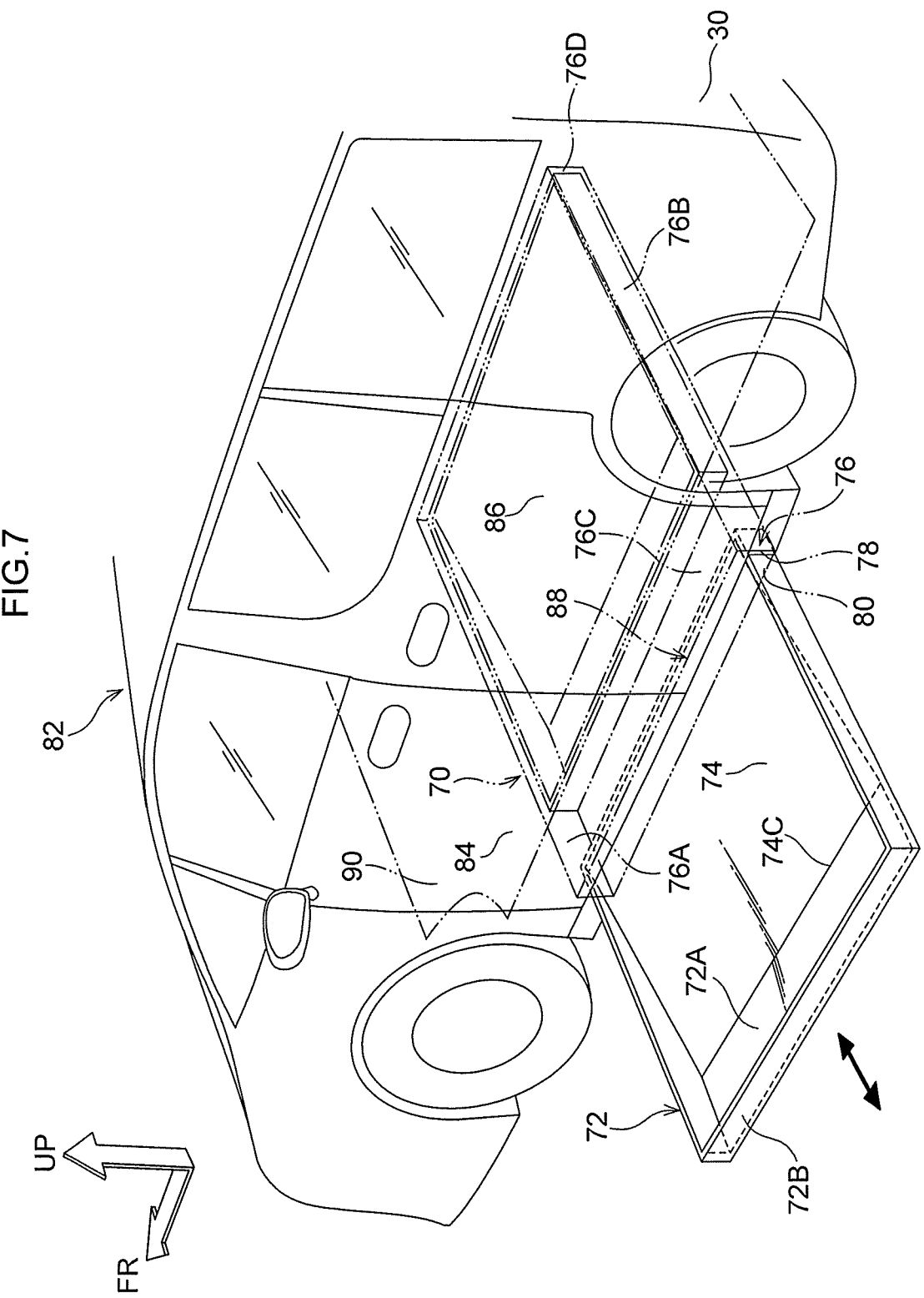
FIG. 7 is a schematic perspective view illustrating a state in which a pull-out receptacle has been pulled out toward a vehicle exterior in a vehicle floor structure according to a third exemplary embodiment.

Next, explanation follows regarding a vehicle floor structure 70 according to a third exemplary embodiment of the present disclosure, with reference to FIG. 7. Note that configuration sections equivalent to those of the first exemplary embodiment and so on described above are allocated the same reference numerals, and explanation thereof is omitted.

The vehicle floor structure 70 according to the third exemplary embodiment has the same basic configuration as that of the first exemplary embodiment, but features a receptacle slope 74 provided to a pull-out receptacle 72.

Namely, as illustrated in FIG. 7, a storage section 76 is provided at the vehicle lower side of the floor 90, and includes a front wall 76A, a rear wall 76B, and a bottom wall 76C. Respective upper ends of the front wall 76A, the rear wall 76B, and the bottom wall 76C are joined to a vehicle lower side face of a floor 90 so as to demarcate a storage space 78. The storage space 78 is connected to a vehicle exterior opening 80.

The vehicle exterior opening 80 is demarcated by a vehicle exterior opening formation section 88 provided at the vehicle lower side of a front door 84 and a rear door 86 on a side face of a vehicle 82. The vehicle exterior opening formation section 88 is formed in a substantially rectangular shape with its length direction along the vehicle front-rear direction in vehicle side view, and is configured by the front wall 76A, rear wall 76B, bottom wall 76C, and floor 90 configuring the storage section 76. Namely, the storage section 76 and the vehicle exterior opening formation section 88 are both configured from the same members.

The pull-out receptacle 72 is provided inside the storage section 76. The pull-out receptacle 72 is installed on a vehicle lower side face inside the storage section 76, namely, on the bottom wall 76C. The pull-out receptacle 72 is formed in a substantially box shape opening toward the vehicle upper side by a receptacle bottom wall 72A with its plate thickness direction substantially along the vehicle vertical direction, and outer frame walls 72B projecting up toward the vehicle upper side from outer edges of the receptacle bottom wall 72A.

The outer frame walls 72B of the pull-out receptacle 72 include one outer frame wall 72B with an outer face extending substantially along the vehicle front-rear direction and abutting the side wall 76D of the storage section 76. The outer frame walls 72B of the pull-out receptacle 72 also include a vehicle front outer frame wall 72B with an outer face abutting the front wall 76A of the storage section 76. The outer frame walls 72B of the pull-out receptacle 72 also include a vehicle rear outer frame wall 72B with an outer face abutting the rear wall 76B of the storage section 76. Accordingly, the pull-out receptacle 72 is capable of moving from inside the storage section 76 to the vehicle exterior through the vehicle exterior opening 80. Note that although not illustrated in the drawings, the size of the pull-out receptacle 72 is set such that, in a state in which the one outer frame wall 72B extending substantially along the vehicle front-rear direction abuts the side wall 76D of the storage section 76, the vehicle front outer frame wall 72B is positioned at the vehicle lower side of the first row of vehicle seats 14A, and the vehicle rear outer frame wall 72B is positioned at the vehicle lower side of the third row of vehicle seats 14C.

The receptacle slope 74 is provided inside the pull-out receptacle 72. In a state in which the pull-out receptacle 72 is disposed inside the storage section 76 (see the double-dotted dashed lines in the drawing), the receptacle slope 74 is inclined toward the vehicle lower side on progression toward the vehicle exterior opening formation section 88, namely, on progression toward the vehicle width direction outer side. Accordingly, a lip 74C at the vehicle lower side of the receptacle slope 74 is positioned beside the vehicle exterior opening formation section 88 in vehicle plan view.

Operation of Third Exemplary Embodiment

Next, explanation follows regarding operation of the third exemplary embodiment.

The above configuration is similar to that of the vehicle floor structure 10 of the first exemplary embodiment with the exception of the point that the receptacle slope 74 is provided to the pull-out receptacle 72. Accordingly, similar advantageous effects to those of the first exemplary embodiment are obtained. Moreover, the pull-out receptacle 72 is provided with the receptacle slope 74. The receptacle slope 74 faces the floor 90, and is inclined toward the vehicle lower side on progression toward the vehicle exterior opening formation section 88. Trash that has dropped into the pull-out receptacle 72 therefore traverses the receptacle slope 74 and collects on the side of the vehicle exterior opening formation section 88. This facilitates the task of pulling the pull-out receptacle 72 out from the vehicle exterior opening formation section 88 and discarding the trash. This thereby enables cleaning of the vehicle cabin 12 interior to be performed more easily.

Fourth Exemplary Embodiment

Figure 8:
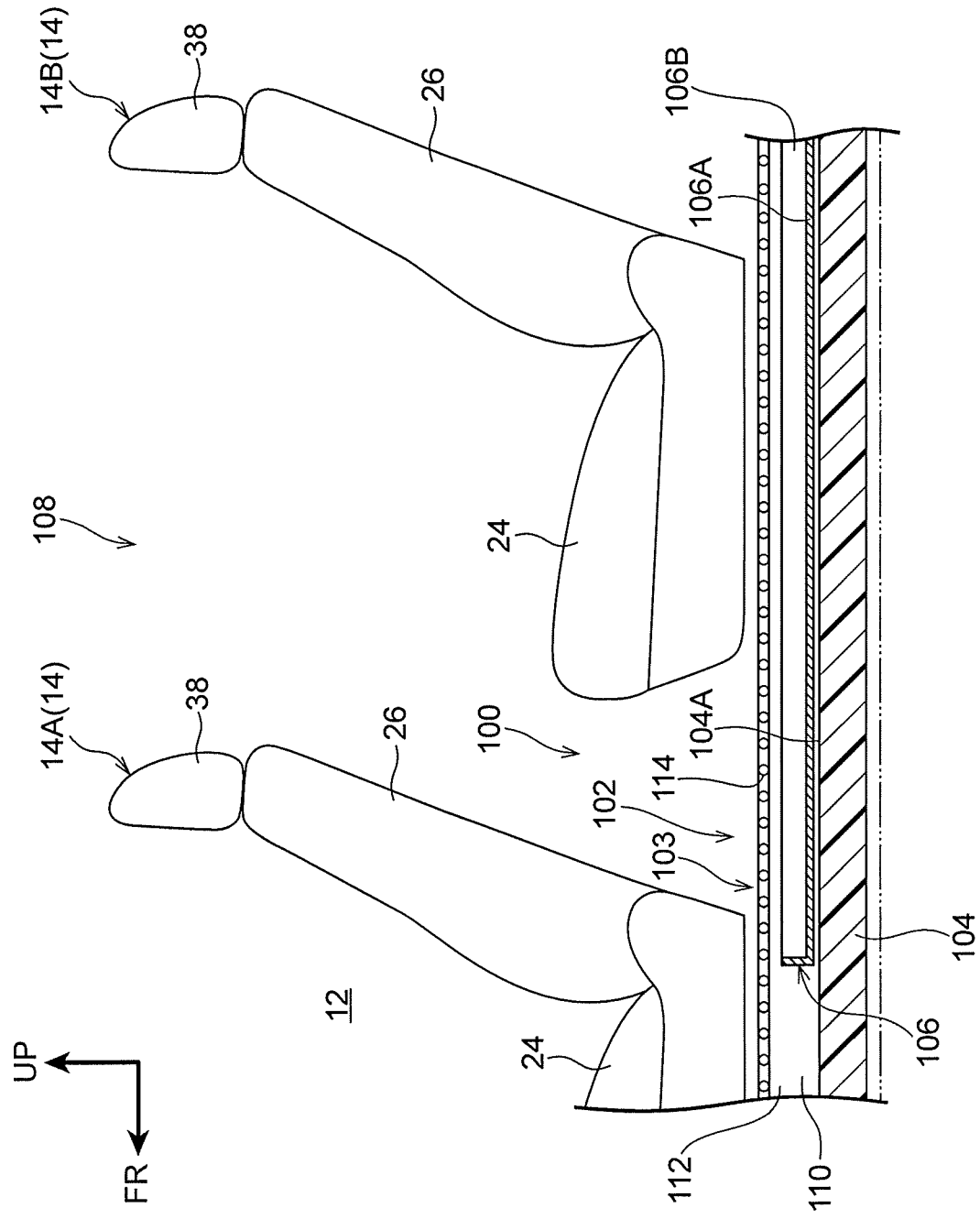
FIG. 8 is a cross-section illustrating relevant portions of a vehicle including a vehicle floor structure according to a fourth exemplary embodiment.

Next, explanation follows regarding a vehicle floor structure 100 according to a fourth exemplary embodiment of the present disclosure, with reference to FIG. 8. Note that configuration sections equivalent to those of the first exemplary embodiment and so on described above are allocated the same reference numerals, and explanation thereof is omitted.

The vehicle floor structure 100 according to the fourth exemplary embodiment has the same basic configuration as that of the first exemplary embodiment, but features a drive battery 104 provided at a vehicle lower side of a floor 102, and a pull-out receptacle 106 installed at the vehicle upper side of the drive battery 104.

Namely, as illustrated in FIG. 8, a vehicle 108 is configured as an electric vehicle powered by a motor (not illustrated in the drawings) driven by electrical power supplied from the drive battery 104 provided at the vehicle lower side of the floor 102. The drive battery 104 is substantially box-shaped, and is attached to the vehicle body by fasteners, not illustrated in the drawings, in a state in which a storage section 110 is present between the drive battery 104 and the floor 102.

The storage section 110 demarcates a storage space 112, this being a box-shaped space with a substantially rectangular shape open toward the vehicle rear in vehicle plan view. Namely, the storage section 110 is, for example, configured including a pair of left and right side walls (neither of which are illustrated in the drawings), a front wall (not illustrated in the drawings) connecting front ends of the side walls together, and an upper wall 104A of the drive battery 104, abutting lower ends of the side walls and a lower end of the front wall. Upper ends of the side walls and an upper end of the front wall are joined to a vehicle lower side face of the floor 102 so as to demarcate the storage space 112.

The floor 102 includes a mesh 103 configured by a mesh pattern of plural, contiguously disposed vehicle interior opening formation sections 114. The pull-out receptacle 106 is provided inside the storage section 110 provided between the floor 102 and the drive battery 104. The pull-out receptacle 106 is made of metal, and is installed at a vehicle lower side face inside the storage section 110, namely, on the upper wall 104A of the drive battery 104. The pull-out receptacle 106 is formed in a substantially box shape opening toward the vehicle upper side by a receptacle bottom wall 106A with a plate thickness direction along the vehicle vertical direction, and outer frame walls 106B projecting up toward the vehicle upper side from outer edges of the receptacle bottom wall 106A. Moreover, the pull-out receptacle 106 is capable of moving from inside the storage section 110 to the vehicle exterior through the vehicle exterior opening 34 (see FIG. 2).

Operation of Fourth Exemplary Embodiment

Next, explanation follows regarding operation of the fourth exemplary embodiment.

The above configuration is similar to that of the vehicle floor structure 10 of the first exemplary embodiment, with the exception of the points that the drive battery 104 is provided at the vehicle lower side of the floor 102, and that the pull-out receptacle 106 is installed at the vehicle upper side of the drive battery 104. Accordingly, similar advantageous effects to those of the first exemplary embodiment are obtained. Moreover, the pull-out receptacle 106 configured from metal is installed at the vehicle upper side of the drive battery 104 provided at the vehicle lower side of the floor 102. Accordingly, warm air or cold air inside the vehicle cabin 12 is transmitted through the vehicle interior opening formation sections 114 to the pull-out receptacle 106 inside the storage section 110, such that the pull-out receptacle 106 attains a temperature close to the temperature inside the vehicle cabin 12. This heat in the pull-out receptacle 106 is transmitted to the drive battery 104, enabling a contribution to be made to cooling or warming the drive battery 104. This thereby enables a contribution to be made to maintaining the performance of the drive battery 104.

Fifth Exemplary Embodiment

Figure 9:
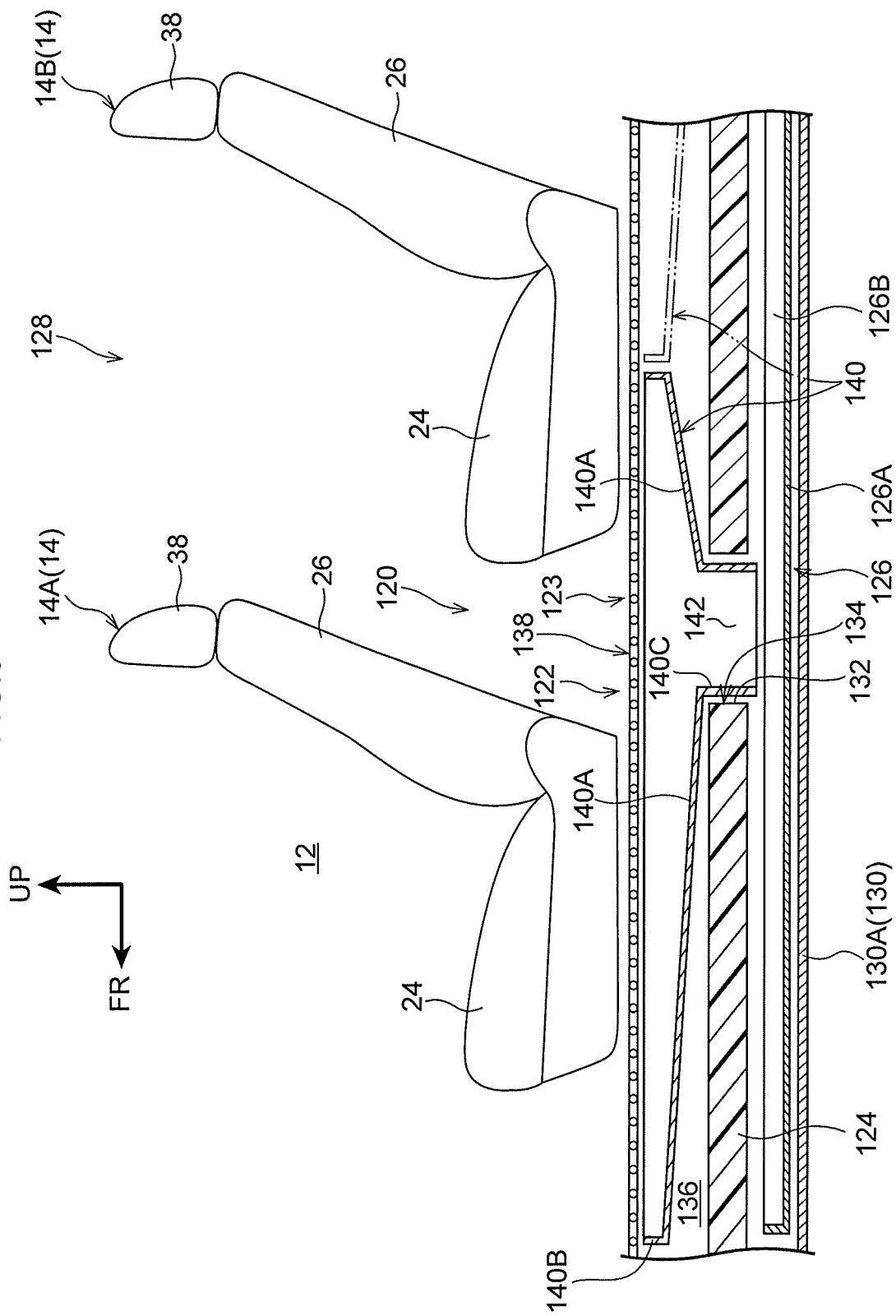
FIG. 9 is a cross-section illustrating relevant portions of a vehicle including a vehicle floor structure according to a fifth exemplary embodiment.

Next, explanation follows regarding a vehicle floor structure 120 according to a fifth exemplary embodiment of the present disclosure, with reference to FIG. 9. Note that configuration sections equivalent to those of the first exemplary embodiment and so on described above are allocated the same reference numerals, and explanation thereof is omitted.

The vehicle floor structure 120 according to the fifth exemplary embodiment has the same basic configuration as that of the first exemplary embodiment, but features a drive battery 124 provided at the vehicle lower side of a floor 122, and a pull-out receptacle 126 provided at the vehicle lower side of the drive battery 124.

Namely, as illustrated in FIG. 9, a vehicle 128 is configured as an electric vehicle powered by a motor (not illustrated in the drawings) driven by electrical power supplied from the drive battery 124 provided at the vehicle lower side of the floor 122. The drive battery 124 is substantially box-shaped, and is provided inside a storage section 130 provided at the vehicle lower side of the floor 122. Note that the drive battery 124 is provided with battery through-passages 134 that demarcate battery through-holes 132 penetrating the drive battery 124 in the vehicle vertical direction. The battery through-passages 134 are, for example, provided between the first row of vehicle seats 14A and the second row of vehicle seats 14B, and between the second row of vehicle seats 14B and the third row of vehicle seats 14C.

The storage section 130 demarcates a storage space 136, this being a box-shaped space with a substantially rectangular shape opening toward the vehicle rear in vehicle plan view. Namely, the storage section 130 is, for example, configured including a pair of left and right side walls (neither of which are illustrated in the drawings), a front wall (not illustrated in the drawings) connecting front ends of the side walls together, and a bottom wall 130A coupling together lower ends of the side walls and a lower end of the front wall. Upper ends of the side walls and an upper end of the front wall are joined to a vehicle lower side face of the floor 122 so as to demarcate the storage space 136.

The floor 122 includes a mesh 123 configured by a mesh pattern of plural, contiguously disposed vehicle interior opening formation sections 138. The pull-out receptacle 126 is provided between the drive battery 124 provided inside the storage section 130 and the bottom wall 130A. The pull-out receptacle 126 is made of metal, and is installed on a vehicle lower side face inside the storage section 130, namely, on the bottom wall 130A. The pull-out receptacle 126 is formed in a substantially box shape opening toward the vehicle upper side by a receptacle bottom wall 126A with its plate thickness direction along the vehicle vertical direction, and outer frame walls 126B projecting up toward the vehicle upper side from outer edges of the receptacle bottom wall 126A. Moreover, the pull-out receptacle 126 is capable of moving from inside the storage section 130 to the vehicle exterior through the vehicle exterior opening 34 (see FIG. 2).

A storage slope 140 are provided between the floor 122 and the drive battery 124 in the storage section 130. The storage slope 140 is, for example, configured from metal, and includes slope bottom walls 140A, outer frame walls 140B, and a drop opening formation section 140C. Each slope bottom wall 140A is formed in a substantially rectangular shape in vehicle plan view, and is inclined toward the vehicle lower side on progression toward the drop opening formation section 140C in vehicle side view.

Each outer frame wall 140B is provided projecting toward the vehicle upper side at an outer edge of the corresponding slope bottom wall 140A. The drop opening formation section 140C is provided at a position corresponding to the feet of occupants (not illustrated in the drawings) seated in the second row of vehicle seats 14B, namely, at a position substantially at the vehicle front-rear direction center between the respective slope bottom walls 140A, and demarcates a drop opening 142 that opens in the vehicle vertical direction. The drop opening formation section 140C extends in the vehicle vertical direction inside the corresponding battery through-passage 134. Namely, the drop opening 142 is in communication with a space above the pull-out receptacle 126.

The storage slope 140 is set to a size such that the vehicle front outer frame wall 140B is positioned at a location corresponding to the feet of occupants (not illustrated in the drawings) seated in the first row of vehicle seats 14A, and the vehicle rear outer frame wall 140B is disposed at a position corresponding to substantially the vehicle front-rear direction center of the second row of vehicle seats 14B. Note that a similarly configured storage slope 140 is disposed further toward the vehicle rear, and the storage slope 140 disposed at the vehicle rear is disposed such that a vehicle front outer frame wall 140B is positioned at the vehicle lower side of the second row of vehicle seats 14B, and a vehicle rear outer frame wall 140B is disposed at a position corresponding to substantially the vehicle front-rear direction center of the third row of vehicle seats 14C.

Operation of Fifth Exemplary Embodiment

Next, explanation follows regarding operation of the fifth exemplary embodiment.

The above configuration is similar to that of the vehicle floor structure 10 of the first exemplary embodiment, with the exception of the points that the drive battery 124 is provided at the vehicle lower side of the floor 122, and the pull-out receptacle 126 is provided at the vehicle lower side of the drive battery 124. Accordingly, similar advantageous effects to those of the first exemplary embodiment are obtained. Moreover, due to providing the pull-out receptacle 126 at the vehicle lower side of the drive battery 124 provided at the vehicle lower side of the floor 122, direct input to the drive battery 124 from obstacles and the like outside the vehicle can be suppressed by the pull-out receptacle 126. This thereby enables the drive battery 124 to be protected.

Moreover, the storage section 130 is provided with the storage slopes 140. The storage slopes 140 face the floor 122, and are inclined toward the vehicle lower side on progression toward the pull-out receptacle 126. Accordingly, trash that has been inserted through the vehicle interior opening formation sections 138 traverses the storage slopes 140 and collects inside the pull-out receptacle 126. There is accordingly no need to provide the pull-out receptacle 126 over a wide range. Namely, for example, the size of the pull-out receptacle 126 can be made smaller. This thereby enables manufacturing costs to be suppressed.

Moreover, the storage slopes 140 are provided at the vehicle upper side of the drive battery 124, and the drop opening formation sections 140C are inserted into the corresponding battery through-passages 134 in the drive battery 124. Accordingly, warm air or cold air inside the vehicle cabin 12 is transmitted through the vehicle interior opening formation sections 138 to the storage slopes 140 inside the storage section 130, such that the storage slopes 140 attain a temperature close to the temperature inside the vehicle cabin 12. This heat in the storage slopes 140 is transmitted to the drive battery 124, enabling a contribution to be made to cooling or warming the drive battery 124. This thereby enables a contribution to be made to maintaining the performance of the drive battery 124.

Sixth Exemplary Embodiment

Figure 10:
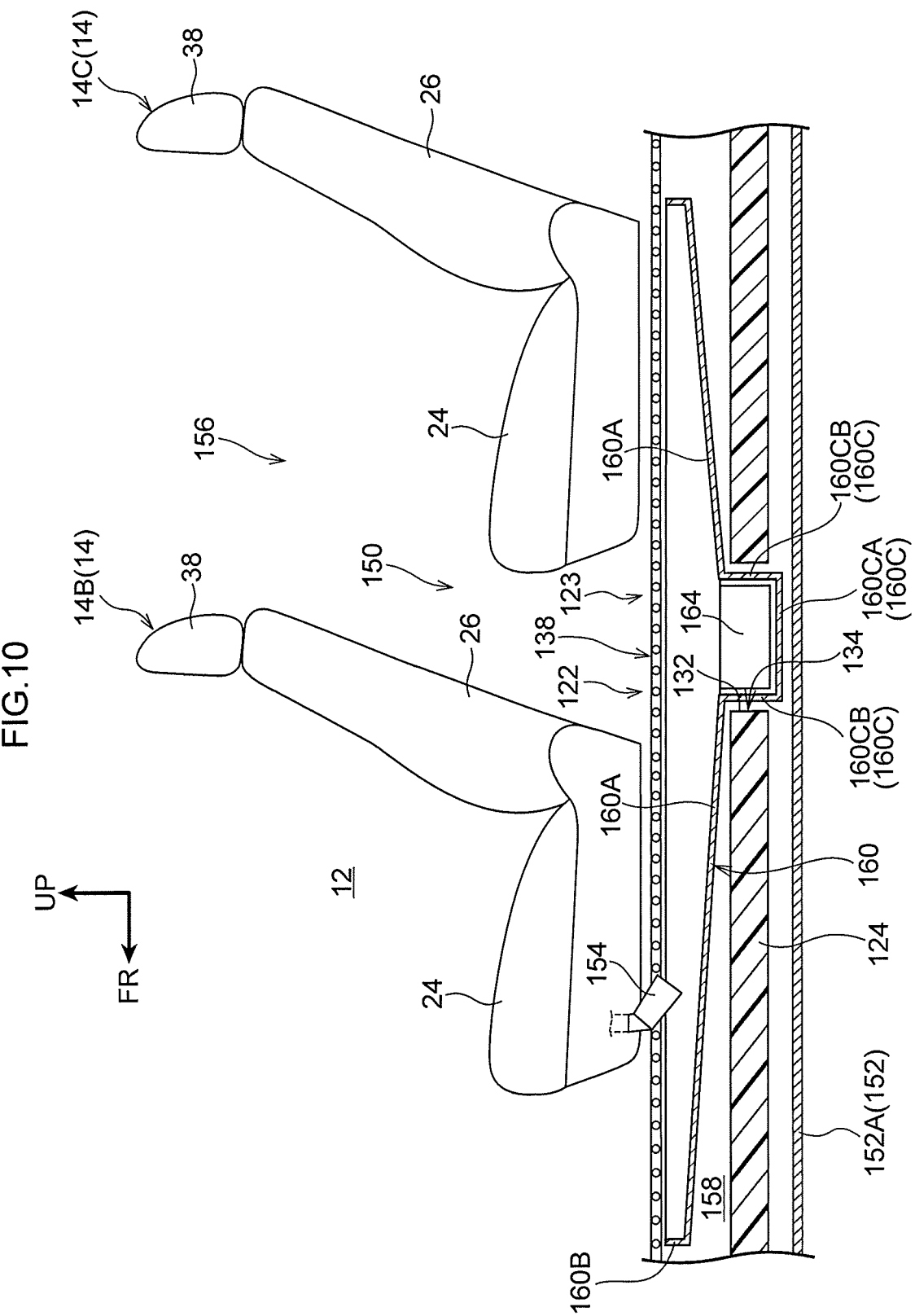
FIG. 10 is a cross-section illustrating relevant portions of a vehicle including a vehicle floor structure according to a sixth exemplary embodiment.
Figure 11:
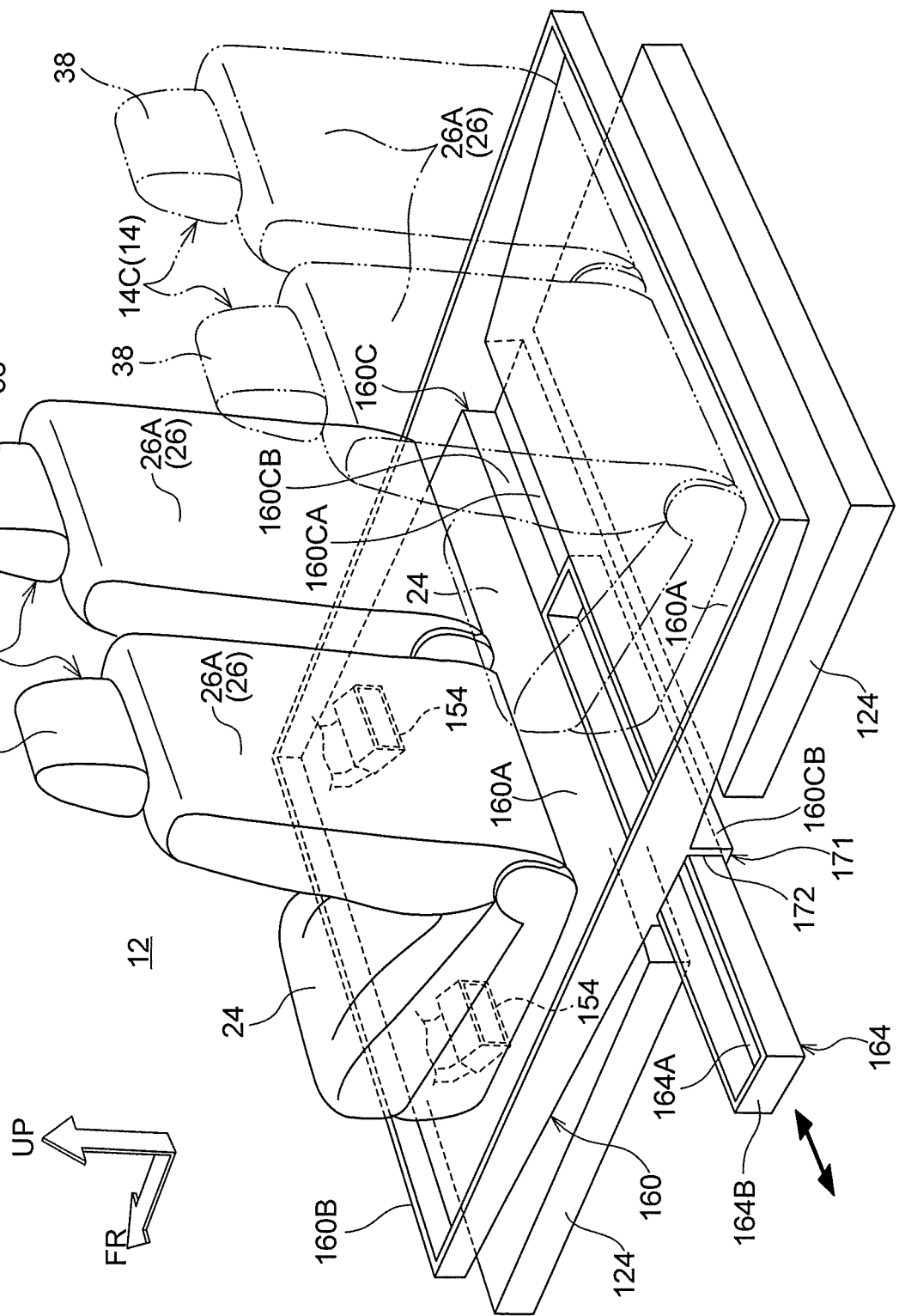

Next, explanation follows regarding a vehicle floor structure 150 according to a sixth exemplary embodiment of the present disclosure, with reference to FIG. 10 and FIG. 11. Note that configuration sections equivalent to those of the first exemplary embodiment or the fifth exemplary embodiment and so on described above are allocated the same reference numerals, and explanation thereof is omitted.

The vehicle floor structure 150 according to the sixth exemplary embodiment has the same basic configuration as that of the first exemplary embodiment and the fifth exemplary embodiment, but features blowers 154 positioned inside a storage section 152.

Namely, as illustrated in FIG. 10, a vehicle 156 is configured as an electric vehicle powered by a motor (not illustrated in the drawings) driven by electrical power supplied from a drive battery 124 provided at the vehicle lower side of a floor 122.

The storage section 152 demarcates a storage space 158, this being a box-shaped space with a substantially rectangular shape opening toward the vehicle rear in vehicle plan view. Namely, the storage section 152 is, for example, configured including a pair of left and right side walls (neither of which are illustrated in the drawings), a front wall (not illustrated in the drawings) connecting front ends of the side walls together, and a bottom wall 152A coupling together lower ends of the side walls and a lower end of the front wall. Upper ends of the side walls and an upper end of the front wall are joined to a vehicle lower side face of the floor 122 so as to demarcate the storage space 158.

A storage slope 160 is provided in the storage section 152 between the floor 122 and the drive battery 124. The storage slope 160 includes slope bottom walls 160A, outer frame walls 160B, and a pull-out receptacle storage section 160C. Each slope bottom wall 160A is formed in a substantially rectangular shape in vehicle plan view, and is inclined toward the vehicle lower side on progression toward the pull-out receptacle storage section 160C in vehicle side view.

Each outer frame wall 160B is provided projecting toward the vehicle upper side at an outer edge of the corresponding slope bottom wall 160A. The pull-out receptacle storage section 160C is provided in a position corresponding to the feet of occupants (not illustrated in the drawings) seated in the third row of vehicle seats 14C, namely, substantially at the vehicle front-rear direction center between the slope bottom walls 160A, and inside a battery through-passage 134. The pull-out receptacle storage section 160C is formed in a substantially U-shaped profile opening toward the vehicle upper side in vehicle side view by a bottom wall 160CA and a pair of side walls 160CB projecting upward toward the vehicle upper side from both vehicle front-rear direction ends of the bottom wall 160CA.

The storage slope 160 is set to a size such that the vehicle front outer frame wall 160B is positioned at a location corresponding to the feet of occupants (not illustrated in the drawings) seated in the second row of vehicle seats 14B, and the vehicle rear outer frame wall 160B is disposed at a position corresponding to substantially the vehicle front-rear direction center of the third row of vehicle seats 14C.

A pull-out receptacle 164 is provided in the pull-out receptacle storage section 160C of the storage slope 160. The pull-out receptacle 164 is made of metal, and is installed on a vehicle lower side face inside the pull-out receptacle storage section 160C, namely, on the bottom wall 160CA. As illustrated in FIG. 11, the pull-out receptacle 164 is formed in a substantially box shape opening toward the vehicle upper side by a receptacle bottom wall 164A with its plate thickness direction along the vehicle vertical direction, and outer frame walls 164B projecting upward toward the vehicle upper side from outer edges of the receptacle bottom wall 164A. The pull-out receptacle 164 is capable of moving from the pull-out receptacle storage section 160C, namely, from inside the storage section 152, to the vehicle exterior through a vehicle exterior opening 172 demarcated by a vehicle exterior opening formation section 171 provided on one vehicle width direction side.

The blowers 154 are provided at the vehicle lower side of the corresponding vehicle seats 14. The blowers 154 are connected to a vehicle air conditioner, not illustrated in the drawings, and blow an airflow conveyed from the vehicle air conditioner against the slope bottom wall 160A of the storage slope 160 and toward the pull-out receptacle 164 (substantially toward the vehicle rear).

Operation of Sixth Exemplary Embodiment

Next, explanation follows regarding operation of the sixth exemplary embodiment.

The above configuration is similar to that of the vehicle floor structures 10, 120 of the first exemplary embodiment and the fifth exemplary embodiment, with the exception of the point that the blowers 154 are provided inside the storage section 152. Accordingly, similar advantageous effects to those of the first exemplary embodiment and the fifth exemplary embodiment are obtained. Moreover, providing the blowers 154 to convey an airflow from the vehicle air conditioner toward the pull-out receptacle 164 inside the storage section 152 enables trash remaining in the storage section 152 to be moved toward the pull-out receptacle 164 by the airflow. This thereby enables trash to be suppressed from remaining in the vehicle cabin 12. This thereby enables cleaning of the vehicle cabin 12 to be made easier.

Moreover, the storage section 152 is provided with the storage slope 160. The storage slope 160 faces the floor 122, and is inclined toward the vehicle lower side on progression toward the pull-out receptacle 164. Accordingly, even when trash that has been inserted through the vehicle interior opening formation sections 138 drops onto a location inside the storage section 152 where the pull-out receptacle 164 is not disposed, the trash traverses the storage slope 160 and collects in the pull-out receptacle 164. There is accordingly no need to provide the pull-out receptacle 164 over a wide range. Namely, for example, the size of the pull-out receptacle 164 and the size of the vehicle exterior opening formation section 171 through which the pull-out receptacle 164 is pulled out can be made smaller. This thereby enables manufacturing costs to be suppressed.

Note that in the sixth exemplary embodiment described above, the blowers 154 blow an airflow substantially toward the vehicle rear; however, there is no limitation thereto. Configuration may be made in which plural blowers 154 are provided facing each other along the vehicle front-rear direction to blow airflows toward the pull-out receptacle 164, or configuration may be made in which blowers 154 blow airflows in different directions to each other.

Moreover, in the first to the sixth exemplary embodiments described above, the pull-out receptacle 50, 72, 106, 126, 164 is formed in a box shape opening toward the vehicle upper side; however, there is no limitation thereto. The pull-out receptacle 50, 72, 106, 126, 164 may be formed in a sheet shape with a sticky member to which trash and the like adheres attached to a vehicle upper face, or may be configured in another manner.

Explanation has been given regarding exemplary embodiments of the present disclosure; however, the present disclosure is not limited to the above, and obviously various modifications may be implemented within a range not departing from the spirit of the present disclosure.

What is claimed is:

1. A vehicle floor structure of a vehicle, comprising:
   a vehicle interior opening formation section inside a vehicle cabin and demarcating a vehicle interior opening that opens into the vehicle cabin;
   a vehicle exterior opening formation section lower in the vehicle than a floor inside the vehicle cabin and demarcating a vehicle exterior opening that opens toward a vehicle exterior;
   a storage section at a vehicle lower side of the floor and demarcating a storage space that connects the vehicle interior opening and the vehicle exterior opening; and
   a pull-out receptacle inside the storage section at a position corresponding to the vehicle interior opening and configured to move from inside the storage section to the vehicle exterior through the vehicle exterior opening.

2. The vehicle floor structure of claim 1, wherein the vehicle interior opening formation section is in a back face of a vehicle seat inside the vehicle cabin.

3. The vehicle floor structure of claim 1, wherein the vehicle interior opening formation section is in the floor.

4. The vehicle floor structure of claim 1, wherein the floor includes a mesh pattern section formed in a mesh pattern by disposing a plurality of vehicle interior opening formation sections contiguously to each other.

5. The vehicle floor structure of claim 1, wherein the pull-out receptacle includes a receptacle slope that faces the floor, and that is inclined toward the vehicle lower side in progression toward the vehicle exterior opening formation section when the pull-out receptacle is disposed inside the storage section.

6. The vehicle floor structure of claim 1, wherein the storage section includes a storage slope that faces the floor, and that is inclined toward the vehicle lower side toward the pull-out receptacle.

7. The vehicle floor structure of claim 1, wherein the storage section includes a blower to convey an airflow from a vehicle air conditioner toward the pull-out receptacle.

8. The vehicle floor structure of claim 1, further comprising:
   a drive battery at the vehicle lower side of the floor, wherein
   the pull-out receptacle is configured from metal and is at a vehicle upper side of the drive battery.

9. The vehicle floor structure of claim 1, further comprising:
   a drive battery at the vehicle lower side of the floor, wherein
   the pull-out receptacle is at the vehicle lower side of the drive battery.

10. The vehicle floor structure of claim 2, wherein the vehicle interior opening formation section is at a back face of a vehicle seatback of the vehicle seat.

* * * * *